US010150280B2

(12) United States Patent
Aghababaie et al.

(10) Patent No.: US 10,150,280 B2
(45) Date of Patent: Dec. 11, 2018

(54) APPARATUS FOR FABRICATION OF THREE DIMENSIONAL OBJECTS (71) Applicant: Holo, Inc., San Francisco, CA (US)

(72) Inventors: Arian Aghababaie, London (GB); Pierre Lin, London (GB)

(73) Assignee: HOLO, INC., Oakland, CA (US)

( * ) Notice: Subject to any disclaimer, the term of this patent is extended or adjusted under 35 U.S.C. 154(b) by 905 days.

(21) Appl. No.: 14/276,869

(22) Filed: May 13, 2014

(65) Prior Publication Data
US 2014/0339741 A1 Nov. 20, 2014

(30) Foreign Application Priority Data

May 14, 2013 (GB) .................................. 1308662.4

(51) Int. Cl.
B29C 67/00 (2017.01)
B33Y 30/00 (2015.01)
B29C 64/20 (2017.01)
B29C 64/124 (2017.01)
B29C 64/255 (2017.01)

(52) U.S. Cl.
CPC ............ *B33Y 30/00* (2014.12); *B29C 64/124* (2017.08); *B29C 64/20* (2017.08); *B29C 64/255* (2017.08); B29K 2883/00 (2013.01)

(58) Field of Classification Search
CPC ........ B33Y 30/00; B29C 64/124; B29C 64/20
See application file for complete search history.

(56) References Cited

U.S. PATENT DOCUMENTS 4,028,450 A    6/1977   Gould
5,133,987 A    7/1992   Lewis et al.
                (Continued)

FOREIGN PATENT DOCUMENTS

DE    199 56 338       3/2003
JP    2010030322 A     2/2010
                (Continued)

OTHER PUBLICATIONS

International Search Report and Written Opinion received for International Patent Application No. PCT/US2014/37998, filed May 14, 2014. dated Sep. 4, 2014. 10 pages.
(Continued)

*Primary Examiner* — Yogendra N Gupta
*Assistant Examiner* — Ninh Le
(74) *Attorney, Agent, or Firm* — Wilson Sonsini Goodrich & Rosati (57) ABSTRACT An apparatus for bottom-up fabrication of three dimensional objects, the apparatus comprising: a vat for a photosensitive polymer, the floor of the vat including a working surface arranged such that, in use, light incident on the working surface interacts with the photosensitive polymer at the working surface to fabricate a portion of the three dimensional object; a build platform capable of being inserted into the vat, the build platform having a planar surface; an elevator mechanism capable of adjusting the separation between the working surface of the vat and the planar surface of the build platform; and a rotation mechanism capable of varying the relative rotational position of the vat relative to the build platform, the relative rotation being about an axis which is normal to the working surface of the vat.

20 Claims, 9 Drawing Sheets

(56) References Cited

U.S. PATENT DOCUMENTS

| | | |
|---|---|---|
| 5,236,326 A | 8/1993 | Grossa |
| 5,435,959 A | 7/1995 | Williamson et al. |
| 5,814,259 A | 9/1998 | Weiser et al. |
| 5,952,397 A | 9/1999 | Fujiki et al. |
| 6,574,523 B1 | 6/2003 | Hanna et al. |
| 6,664,354 B2 | 12/2003 | Savu et al. |
| 6,780,472 B2 | 8/2004 | Hamrock et al. |
| 6,833,043 B1 | 12/2004 | Parsonage et al. |
| 6,852,781 B2 | 2/2005 | Savu et al. |
| 7,022,410 B2 | 4/2006 | Tonapi et al. |
| 7,101,618 B2 | 9/2006 | Coggio et al. |
| 7,173,778 B2 | 2/2007 | Jing et al. |
| 7,195,472 B2 | 3/2007 | John |
| 7,223,826 B2 | 5/2007 | Ali et al. |
| 7,267,850 B2 | 9/2007 | Coggio et al. |
| 7,288,469 B2 | 10/2007 | Sharma et al. |
| 7,288,514 B2 | 10/2007 | Scheuing et al. |
| 7,332,217 B2 | 2/2008 | Coggio et al. |
| 7,417,099 B2 | 8/2008 | Savu et al. |
| 7,438,846 B2 | 10/2008 | John |
| 7,491,441 B2 | 2/2009 | Pokorny et al. |
| 7,510,388 B2 | 3/2009 | Terasaki |
| 7,511,008 B2 | 3/2009 | Scheuing et al. |
| 7,575,847 B2 | 8/2009 | Jing et al. |
| 7,604,758 B2 | 10/2009 | Akutsu et al. |
| 7,632,560 B2 | 12/2009 | Filippini et al. |
| 7,662,896 B2 | 2/2010 | Savu et al. |
| 7,718,264 B2 | 5/2010 | Klun et al. |
| 7,845,930 B2 | 12/2010 | Shkolnik et al. |
| 7,907,878 B2 | 3/2011 | Takagi et al. |
| 7,912,411 B2 | 3/2011 | Takagi et al. |
| 8,110,135 B2 | 2/2012 | El-Siblani |
| 8,133,551 B2 | 3/2012 | Claes |
| 8,147,966 B2 | 4/2012 | Klun et al. |
| 8,372,330 B2 | 2/2013 | El-Siblani et al. |
| 8,372,913 B2 | 2/2013 | Claes |
| 8,394,313 B2 | 3/2013 | Shkolnik et al. |
| 8,476,398 B2 | 7/2013 | Klun et al. |
| 8,551,285 B2 | 10/2013 | Ho et al. |
| 8,623,264 B2 | 1/2014 | Rohner et al. |
| 8,716,377 B2 | 5/2014 | Taden et al. |
| 8,729,211 B2 | 5/2014 | Klun et al. |
| 8,741,203 B2 | 6/2014 | Liska et al. |
| 8,753,464 B2 | 6/2014 | Khanna |
| 8,801,418 B2 | 8/2014 | El-Siblani et al. |
| 8,829,070 B2 | 9/2014 | Morita et al. |
| 8,859,642 B2 | 10/2014 | Miyamoto |
| 8,916,335 B2 | 12/2014 | Kitano et al. |
| 9,120,270 B2 | 9/2015 | Chen et al. |
| 9,205,601 B2 | 12/2015 | Desimone et al. |
| 9,211,678 B2 | 12/2015 | Desimone et al. |
| 9,216,546 B2 | 12/2015 | Desimone et al. |
| 9,306,218 B2 | 4/2016 | Pyun et al. |
| 9,360,757 B2 | 6/2016 | Desimone et al. |
| 9,415,418 B2 | 8/2016 | Sreenivasan et al. |
| 9,452,567 B2 | 9/2016 | Syao et al. |
| 9,453,142 B2 | 9/2016 | Rolland et al. |
| 9,486,944 B2 | 11/2016 | El-Siblani et al. |
| 9,498,920 B2 | 11/2016 | Desimone et al. |
| 9,527,244 B2 | 12/2016 | El-Siblani et al. |
| 9,533,450 B2 | 1/2017 | El-Siblani et al. |
| 9,561,623 B2 | 2/2017 | El-Siblani et al. |
| 9,567,439 B1 | 2/2017 | Pyun et al. |
| 9,598,606 B2 | 3/2017 | Rolland et al. |
| 9,676,963 B2 | 6/2017 | Rolland et al. |
| 9,718,096 B2 | 8/2017 | Sreenivasan et al. |
| 9,796,138 B2 | 10/2017 | Liska et al. |
| 9,975,295 B2 | 5/2018 | Rolland et al. |
| 9,975,296 B2 | 5/2018 | El-Siblani et al. |
| 9,982,164 B2 | 5/2018 | Rolland et al. |
| 9,987,653 B2 | 6/2018 | Sreenivasan et al. |
| 9,987,804 B2 | 6/2018 | El-Siblani et al. |
| 9,993,974 B2 | 6/2018 | Desimone et al. |
| 1,001,107 A1 | 7/2018 | El-Siblani Ali et al. |
| 1,001,693 A1 | 7/2018 | Desimone et al. |
| 2007/0075461 A1 | 4/2007 | Hunter et al. |
| 2009/0020901 A1* | 1/2009 | Schillen ............... B29C 67/0051 264/31 |
| 2009/0309267 A1* | 12/2009 | Boot ................... B29C 67/0066 264/496 |
| 2011/0006459 A1 | 1/2011 | Cregger |
| 2011/0309554 A1 | 12/2011 | Liska et al. |
| 2011/0310370 A1 | 12/2011 | Rohner et al. |
| 2012/0107625 A1 | 5/2012 | Smith et al. |
| 2013/0001834 A1 | 1/2013 | El-Siblani et al. |
| 2013/0026675 A1 | 1/2013 | Yoneshima et al. |
| 2013/0292862 A1* | 11/2013 | Joyce ................... B29C 67/0096 264/40.1 |
| 2015/0231828 A1 | 8/2015 | El-Siblani et al. |
| 2015/0231831 A1 | 8/2015 | El-Siblani |
| 2015/0343745 A1 | 12/2015 | Pesek et al. |
| 2015/0344682 A1 | 12/2015 | Ganapathiappan et al. |
| 2016/0046075 A1 | 2/2016 | Desimone et al. |
| 2016/0059484 A1 | 3/2016 | Desimone et al. |
| 2016/0059486 A1 | 3/2016 | Desimone et al. |
| 2016/0059487 A1 | 3/2016 | Desimone et al. |
| 2016/0122539 A1 | 5/2016 | Okamoto et al. |
| 2016/0131974 A1 | 5/2016 | Abe et al. |
| 2016/0141535 A1 | 5/2016 | Snaith et al. |
| 2016/0160077 A1 | 6/2016 | Rolland et al. |
| 2016/0164031 A1 | 6/2016 | Pieper et al. |
| 2016/0193786 A1 | 7/2016 | Moore et al. |
| 2016/0200052 A1 | 7/2016 | Moore et al. |
| 2016/0325493 A1 | 11/2016 | Desimone et al. |
| 2017/0021562 A1 | 1/2017 | El-Siblani et al. |
| 2017/0080641 A1 | 3/2017 | El-Siblani |
| 2017/0113416 A1 | 4/2017 | Desimone et al. |
| 2017/0151718 A1 | 6/2017 | Rolland et al. |
| 2017/0173881 A1 | 6/2017 | Dachs, II et al. |
| 2017/0210077 A1 | 7/2017 | Ermoshkin et al. |
| 2017/0239887 A1 | 8/2017 | Rolland et al. |
| 2017/0246660 A1 | 8/2017 | Thompson et al. |
| 2017/0246804 A1 | 8/2017 | El-Siblani et al. |
| 2017/0334129 A1 | 11/2017 | Ebert et al. |
| 2017/0342182 A1 | 11/2017 | Pesek et al. |
| 2017/0369633 A1 | 12/2017 | Caruso et al. |
| 2018/0001552 A1 | 1/2018 | Dachs, II et al. |
| 2018/0015669 A1 | 1/2018 | Moore et al. |
| 2018/0044448 A1 | 2/2018 | Moser et al. |
| 2018/0071977 A1 | 3/2018 | Tumbleston et al. |
| 2018/0079865 A1 | 3/2018 | Pyun et al. |
| 2018/0100037 A1 | 4/2018 | Pyun |
| 2018/0105649 A1 | 4/2018 | Pyun et al. |
| 2018/0133959 A1 | 5/2018 | Moore et al. |

FOREIGN PATENT DOCUMENTS

| | | |
|---|---|---|
| WO | WO-0104866 A1 | 1/2001 |
| WO | WO 2008/055533 | 5/2008 |
| WO | WO 2010/045951 | 4/2010 |
| WO | WO-2014186463 A1 | 11/2014 |
| WO | WO-2015031227 A1 | 3/2015 |
| WO | WO-2017011533 A1 | 1/2017 |
| WO | WO-2017051084 A1 | 3/2017 |
| WO | WO-2017053783 A1 | 3/2017 |
| WO | WO-2017066546 A1 | 4/2017 |
| WO | WO-2017112483 A2 | 6/2017 |
| WO | WO-2017112682 A1 | 6/2017 |
| WO | WO-2017112751 A1 | 6/2017 |
| WO | WO-2017210298 A1 | 12/2017 |
| WO | WO-2017214007 A1 | 12/2017 |
| WO | WO-2018006018 A1 | 1/2018 |
| WO | WO-2018006029 A1 | 1/2018 |
| WO | WO-2018081053 A1 | 5/2018 |
| WO | WO-2018094131 A1 | 5/2018 |
| WO | WO-2018102341 A1 | 6/2018 |
| WO | WO-2018106472 A1 | 6/2018 |

OTHER PUBLICATIONS

Examination Report under Section 18(3) in Great Britain priority Application No. 1308662.4, dated Jul. 14, 2016, 3 pages.

(56) References Cited

OTHER PUBLICATIONS

Search Report in Great Britain Application No. 1308662.4, filed Mar. 14, 2013. dated Nov. 13, 2013. 1 page.
Dendukuri, et al. *Continuous-Flow Lithography for High-Throughput Microparticle Synthesis*. Nature Materials, vol. 5, May 2006. pp. 365-369.
Communication pursuant to Article 94(3) EPC in Application No. EP 14 797 164.2, dated Mar. 3, 2017, 6 pages.
Supplementary European Search Report in Application No. EP 14 79 7164.2, dated Nov. 2, 2016, 6 pages.
Authorized officer Kihwan Moon, International Preliminary Report on Patentability in PCT/US2014/037998, dated Nov. 26, 2015, 8 pages.

* cited by examiner

FIG. 9C

APPARATUS FOR FABRICATION OF THREE DIMENSIONAL OBJECTS

CROSS REFERENCE TO RELATED APPLICATIONS

This application claims priority to U.K. Patent Application No. 1308662.4, filed on May 14, 2013, the entire contents of which are hereby incorporated by reference.

FIELD OF THE INVENTION

The present invention relates to an apparatus for bottom-up fabrication of three dimensional objects.

BACKGROUND OF THE INVENTION

Additive manufacturing (also known as 3D printing, solid free-form fabrication, rapid prototyping and rapid manufacturing) is commonly used to manufacture three-dimensional solid objects. It is particularly useful for applications where speed of manufacture is important but where low costs are desirable, for example in the manufacture of prototypes.

The additive manufacturing process involves the creation of a three dimensional object by successive addition of multiple material layers, each layer having a finite thickness. A variety of methods fall under the umbrella of additive manufacturing including: stereolithography (SLA), fused deposition modelling (FDM), selective deposition modelling (SDM), laser sintering (LS) and selective light modulation (SLM).

Each of the above known methods includes the following steps:

1. The conversion of a computer-generated 3D model to a file format (such as .STL or .OBJ) which provides geometric information in a physical Cartesian space. Computer aided design (CAD) software may be used to generate the initial 3D model.

2. Once converted, the 3D model is broken down ("sliced") into a series of two-dimensional ('2D') discrete cross sections.

3. A computer controlled apparatus successively fabricates each cross section, one on top of another in the z-direction, forming successive layers of build material on top of another which in turn forms the three dimensional object.

The fabrication process differs between the above-mentioned methods, as does the choice of build material.

The fabrication process used in both stereolithography (SLA) and selective light modulation (SLM) involves a build material of liquid photosensitive polymer (often known as a 'resin') and a mechanism for exposing the photosensitive polymer to electromagnetic radiation.

Exposed photosensitive polymer undergoes a chemical reaction leading to polymerization and solidification. The solidification of the photosensitive polymer is commonly known as "curing", and the solidified photosensitive polymer is said to have been "cured" or "hardened".

In both SLA and SLM, electromagnetic radiation is applied to a targeted area known as the "working surface". However, the two processes differ from one another in the way that the electromagnetic radiation is applied to the targeted area: SLA systems use a laser beam mounted on an x-y scanning system to create each material layer of the 3D object by tracing a digital cross-section onto the photosensitive polymer; SLM systems on the other hand, use spatial light modulators such as digital projectors to project the whole digital cross-section onto the photosensitive polymer in one go. The digital projector may be based on: Digital Light Processing (DLP), Digital Micromirror Device (DMD), Liquid Crystal Display (LCD), or Liquid Crystal on Silicon (LCOS).

The apparatus required to carry out SLA or SLM methods usually includes: a vat to hold the photosensitive polymer; a source of electromagnetic radiation (typically UV, near-UV, or visible light); a build platform; an elevator mechanism capable of adjusting the separation of the vat and the build platform; and a controlling computer.

The apparatus may be configured in a "top-down" arrangement in which the source of electromagnetic radiation is located above the vat, or in a "bottom-up" arrangement where the source of electromagnetic radiation is located below the vat.

Figure 1A:
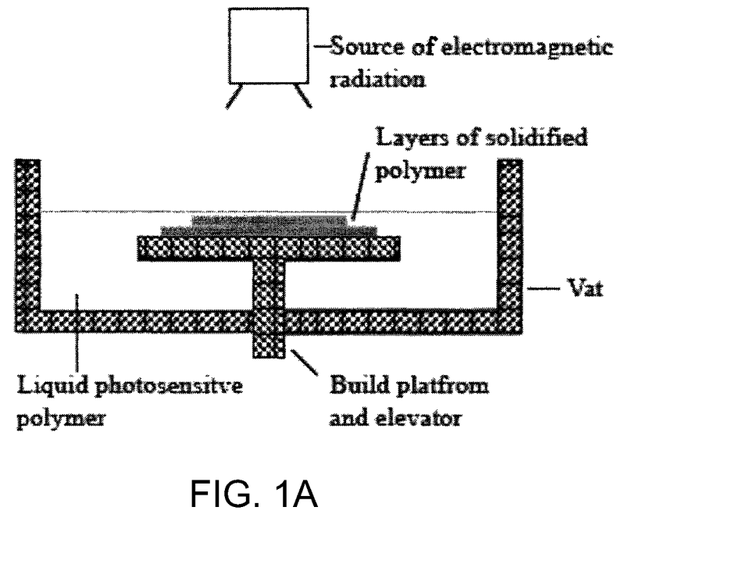
FIG. 1A shows a cross section of a top-down prior art arrangement and FIG. 1B shows a bottom-up prior art arrangement.

In a top-down arrangement, such as that shown in FIG. 1A, the source of the electromagnetic radiation is located above the vat. In use, the build platform is positioned below the surface of the photosensitive polymer. The working surface is the photosensitive polymer located above the build platform and the distance between the upper surface of the photosensitive polymer and the upper surface of the build platform defines the cross-sectional thickness of a cured layer. Disadvantages associated with the top-down method include the necessary process of recoating the cured photosensitive polymer with uncured ("fresh") photosensitive polymer. In addition, the high viscosity of the photopolymer and high surface tension can lead to difficulties in levelling the surface of the photosensitive polymer.

Figure 1B:
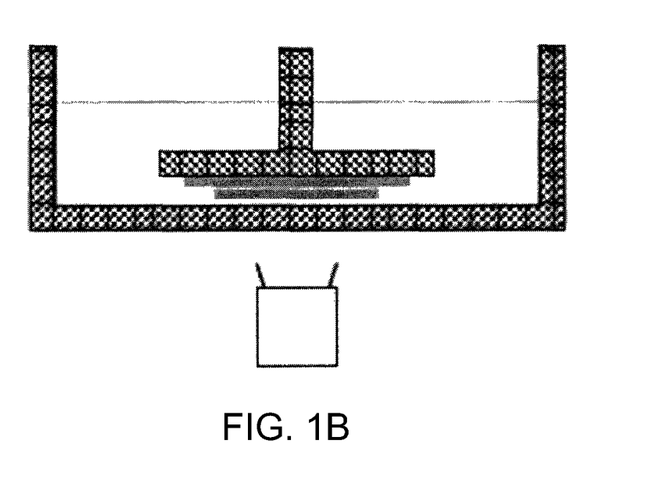

In a bottom-up arrangement, such as that shown in FIG. 1B, the issue of levelling the surface of the photosensitive polymer is avoided by locating the source of electromagnetic radiation below the vat. A layer of photosensitive polymer sandwiched between an optically clear vat floor and the build platform forms the working surface and allows for precise control over the layer thickness and the surface quality of the layer of photopolymer. However, as the photosensitive polymer hardens, it bonds to those surfaces it is in contact with resulting in high separation forces and difficulties in raising the build platform to build the next layer and a risk of damaged to the cured layer.

It is known that damage during separation can be reduced by non-stick coatings and/or thin film layers on the vat. However, these coatings and layers add to the cost of the 3D printing equipment.

Dendukuri, et al (2006), Nature Mater., Vol. 5, pp. 365-369 suggested the application of coatings that inhibit the cure of the photosensitive polymer to the vat floor. A coating of PDMS (an optically clear oxygen rich resin) is applied to the bottom of the vat, the presence of oxygen inhibits the cure of acrylate polymers thus creating a layer of uncured liquid polymer (approximately 2.5µ thick) between the PDMS and the solidified layer. As a result the cured layer does not adhere to the vat floor thus reducing the forces required to raise the elevator. However, when using a cure-inhibition coating, the separation forces between the vat floor and the cured part can be still be very large due to the surface tension forces associated with thin-film viscous liquids. The surface tension forces are particularly important because they are inversely proportional to the layer thickness.

One method of overcoming damage due to surface tension forces is x-translation which utilises a cure-inhibition coating with a slide mechanism and variable depth vat. The cure inhibition coating on the vat floor creates a non-cured layer that acts as a lubricant between the vat floor and the cured part thus the cured part can easily glide on the cure-inhibition layer. The cured cross-section is slid off the cure-inhibition layer into a deeper channel, increasing the distance between the solidified part and the vat floor, reducing surface tension forces by an order of magnitude, allowing the build platform to be raised easily before being moved back to a position above the build platform. This method of translating the build platform from a shallow channel to a deeper channel via translation in the x-direction typically requires an additional "over-lift" step, where the build platform is raised higher than necessary in order to allow for photosensitive polymer to recoat the working surface. Any such additional step/extra movement leads to an undesirable build-up in the time taken to prepare the working surface for the next layer.

As 3D models are sliced into thousands of material layers, it is important to reduce the fabrication time of each cross-section. This depends upon a number of factors such as the time to cure the photosensitive polymer at the desired thickness and the time to prepare the working surface for the next layer. The time to cure the photosensitive polymer is a function of the power of the source of the electromagnetic radiation at the working surface and the composition of the photosensitive polymer. Typically, high power sources result in shorter cure times. The time taken to prepare the working surface for the next layer typically depends on the separation method and time taken to recoat the working surface with fresh photosensitive polymer. Several extra seconds taken during the layer separation process for a model with thousands of layers will add extra hours onto the overall fabrication time.

The apparatus used in the above described SLA and SLM methods tend to be mechanically complex, difficult to operate and maintain and expensive to buy and use. The use of high power lasers and UV light sources tends to significantly increase the cost of the machines both to purchase and to use through high-energy consumption. Furthermore, the health and safety risks of high power laser and UV light source make current systems unsuitable for home use or by untrained personnel.

SUMMARY OF THE INVENTION

According to a first aspect, the present invention aims to solve the above problems by providing an apparatus for bottom-up fabrication of three dimensional objects, the apparatus comprising: a vat for a photosensitive polymer, the floor of the vat including a working surface arranged such that, in use, light incident on the working surface interacts with the photosensitive polymer at the working surface to fabricate a portion of the three dimensional object; a build platform capable of being inserted into the vat, the build platform having a planar surface; an elevator mechanism capable of adjusting the separation between the working surface of the vat and the planar surface of the build platform; and a rotation mechanism capable of varying the relative rotational position of the vat relative to the build platform, the relative rotation being about an axis which is normal to the working surface of the vat.

In addition to providing a mechanism by which the build platform can be moved over the deeper channel (thereby reducing the separation forces), the rotational movement causes the liquid photopolymer to re-coat the print area. This means that there is no need for an additional "over lift" step to ensure re-lamination of the photosensitive polymer. The relative rotation therefore results in a reduction of the number of steps required whilst still ensuring adequate re-lamination. By reducing the number of steps required, the relative rotation results in a more efficient apparatus.

Another advantage of the relative rotation mechanism is that it reduces the mechanical complexity of the apparatus as compared for example to the x-translation method. With x-translation a second linear actutation system is required comprising of a stepper motor, linear actutator etc. This system has to be either attached to the z-axis elevator so that the build platform can move in the x-direction or fixed to the machine such that the vat moves in the x-direction and the build platform is fixed. Linear actuation systems are complex and expensive compared to rotation actuation systems.

Optional features of the invention will now be set out. These are applicable singly or in any combination with any aspect of the invention.

Optionally, the rotation mechanism is arranged to vary the rotational position of the vat.

In this way it is not necessary to translate the build platform in the x-direction. This is a mechanical advantage as the mechanical drive needed to rotate the vat is advantageously simple compared with the mechanical drive that would be necessary to translate the build platform in the x-direction.

Optionally, the rotation mechanism is a rotatable plate upon which the vat is mounted.

Optionally, the vat includes a plug and the rotatable plate includes an aperture, the plug being configured to engage the aperture to secure the vat to the rotatable plate.

Optionally, the rotation mechanism is arranged to vary the rotational position of the build platform.

Preferably, the apparatus further comprises a heating element in thermal contact with the vat.

In this way, the photosensitive polymer can be heated during the additive manufacturing process. This reduces the photo energy required to solidify the polymer and therefore reduces the time to solidify each layer.

Furthermore, surface tension decreases with increasing temperature so the presence of a heating element can further reduce undesirable separation forces.

Additionally, viscosity of the photosensitive polymer decreases with temperature. A decrease in the viscosity of the photosensitive polymer is desirable because it means that re-coating of the working surface is easier.

The heating element is preferably placed underneath the vat. In this way it is out of contact with the polymer and maintenance of the system is therefore reduced.

Preferably the floor has a thickness of at least 5 mm. In this way, the vat holds its shape itself so that no supporting structure is needed for this purpose.

Even more preferably the entire floor of the vat has thickness of at least 5 mm.

Even more preferably, the entire floor of the vat and the surrounding walls of the vat have a thickness of at least 5 mm.

Preferably, the floor of the vat includes a first floor portion of a first thickness and a second floor portion of a second thickness, the second thickness being less than the first thickness; such that the first floor portion defines a raised working surface.

In this way, the first floor portion defines a raised working surface. In other words, a variable thickness vat is formed with the working surface raised above the rest of the floor of the vat. This creates a two-channel vat with a shallow and a deep channel. The separation force due to surface tension of the liquid polymer is inversely proportionally to the thickness of the liquid thus if the build platform is moved from the shallow to the deep channel the separation forces can be greatly reduced, therefore allowing the elevator mechanism to be lightweight and a low torque motor to be used, thus saving space and reducing the power consumption of the machine. Furthermore, the light loads on the elevator reduce the wear and tear on the drive mechanism thus prolonging the life-span of the mechanism.

Preferably, the first floor portion has a thickness of at least 6 mm and the second floor portion has a thickness of at least 5 mm.

Optionally, the vat is formed entirely of a liquid silicone rubber.

In this way, the material of the vat inhibits the cure of acrylate polymers. This means that after exposure of the photosensitive polymer at the working surface, the liquid silicone rubber results in a lubricating layer of liquid polymer between the vat and the solidified layer of the three dimensional object formed by the exposed photosensitive polymer. This means that during relative rotation of the vat relative to the build platform, the solidified part will glide on the surface of the silicone with virtually no shear forces. This enables even delicate parts of a three dimensional object to be fabricated with a reduced risk of damage.

In addition, the use of solid liquid silicone rubber means that the vat is more resilient than a non-silicone vat than has been coated with a PDMS like coating because liquid silicone rubber has a much greater tear strength and hardness. PDMS coatings tend to become damaged over time and need to be replaced. Leakage of photosensitive polymer through a damaged PDMS coating can also necessitate the replacement of the entire vat. The use of liquid silicone rubber to create the entire vat therefore reduces maintenance and increases the life span of the vat.

Furthermore, the use of liquid silicone rubber simplifies fabrication because the vat can be injection moulded in one piece. The part count and manufacturing complexity is significantly reduced.

Additional benefits of using a silicone vat are ease of maintenance as the whole vat inhibits the cure of the photopolymer and therefore excess polymer can be easily removed. A liquid silicone vat has a reduced risk of damage during use or whilst in transit compared to solid vats due to the silicone's inherent flexible properties.

Furthermore, silicone rubber has a high temperature resistance allowing for the use of heating elements to further increase the reactivity of the polymer and to reduce its viscosity; both of which are desirable.

Optionally, the working surface of the vat is a replaceable optically clear silicone pad. In this way, the working surface can be easily removed in the event that it becomes damaged.

The optically clear silicone pad preferably has a thickness of at least 5 mm.

According to a second aspect of the present invention, there is provided a vat for bottom-up fabrication of three dimensional objects, the vat formed entirely of a liquid silicone rubber. Advantages associated with this vat are discussed above.

According to a third aspect of the present invention, there is provided a vat for bottom-up fabrication of three dimensional objects, the vat including a replaceable optically clear silicone pad. Advantages associated with this vat are discussed above.

According to a fourth aspect of the present invention, there is provided an apparatus for bottom-up fabrication of three dimensional objects, the apparatus comprising: a vat for a photosensitive polymer, the floor of the vat including a working surface arranged such that, in use, light incident on the working surface interacts with the photosensitive polymer at the working surface to fabricate a portion of the three dimensional object; a build platform capable of being inserted into the vat, the build platform having a planar surface; an elevator mechanism capable of varying the separation between the working surface of the vat and the planar surface of the build platform; and a heating element in thermal contact with the vat.

Preferably, the apparatus further comprises a motorized plate capable of moving the vat relative to the build platform along a direction which is different to the direction of separation provided by the elevator mechanism; wherein the heating element is located between the motorized plate and the vat.

According to a fifth aspect of the present invention there is provided an apparatus for bottom-up fabrication of three dimensional objects including a source of electromagnetic radiation having a wavelength of 405 nm.

Preferably, the source of electromagnetic radiation is a 405 nm LED.

In this way, standard DMDs (with a low power 405 nm LED) found within home-entertainment digital projectors can be used; there is no need for expensive DMDs that have been developed specially for use with high-power UV light. Also, low-power 405 nm LEDs are cheaper than high power UV LEDs, UV bulbs, metal halide bulbs or lasers.

Low power 405 nm LEDs have typical power values of between 2-10 W. Low power UV LEDs of a similar optical power are considerably more expensive. Furthermore, a UV specific DMD is required for wavelengths below 400 nm and these are typically an order of magnitude more expensive than standard DMDs.

High power UV LEDs have typical power values of 20-100 W and require extensive thermal management which significantly increases the cost of the projection electronics. Like the low power UV LEDs they also require a UV specific DMD.

UV or metal halide bulbs have typical power values of hundreds of Watts. They also have a reduced lifespan compared to LEDs. A Metal halide bulb will typically have to be replaced after 2,000-3,000 hours of use whereas an LED has a typical life span of approximately 20,000 hours.

Furthermore the optical power output of metal halide bulbs will degrade over time thus reducing the power output and increasing exposure times and hence print times. Optical output of LEDs will not degrade over their lifespan. In addition, low power LEDs are more energy efficient than high power UV LEDs or UV bulbs or lasers, resulting in a significant reduction in running costs.

In addition, the use of a low-power 405 nm LED is advantageous due to the reduced health and safety risk as compared to high powered UV LEDs and UV lasers. this means that the apparatus can be operated without significant health and safety-training and is therefore more suitable for home environments. The power output of laser can be as low 30 mW. However, as the size of the beam is very small (300 Microns in diameter) the power/unit area is high which means that they pose a significant risk to the eyes of a user (IEC 60825-1 Standard Class 3B Hazard).

According to a sixth aspect of the present invention, there is provided a method of bottom-up fabrication of three dimensional objects, the method comprising the steps of: providing a vat containing photosensitive polymer, the floor of the vat including a working surface; providing a build platform capable of being inserted into the vat, the build platform having a planar surface; positioning the build platform within the vat to create a layer of photosensitive polymer between the planar surface of the build platform and the working surface of the vat; exposing a region of the layer of photosensitive polymer to electromagnetic radiation to cure the exposed region; separating the cured photosensitive polymer from the working surface of the vat by rotating the working surface of the vat relative to the planar surface of the build platform, the rotation being about an axis which is normal to the working surface of the vat.

Further optional features of the invention are set out below.

BRIEF DESCRIPTION OF THE DRAWINGS

Embodiments of the invention will now be described by way of example with reference to the accompanying drawings in which.

DETAILED DESCRIPTION

Figure 2:
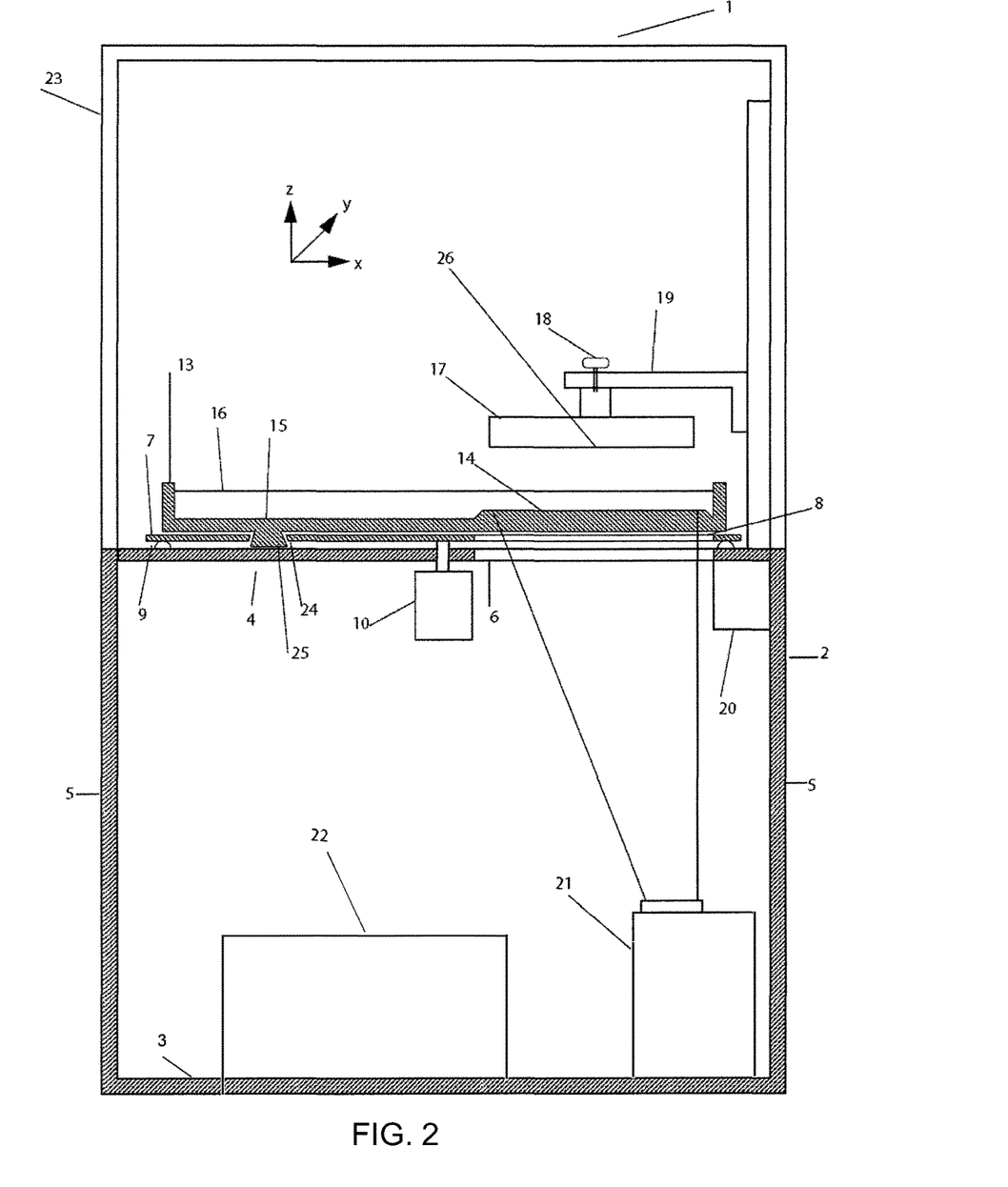
FIG. 2 shows a cross section of an apparatus according to a first embodiment of the present invention.
Figure 3A:
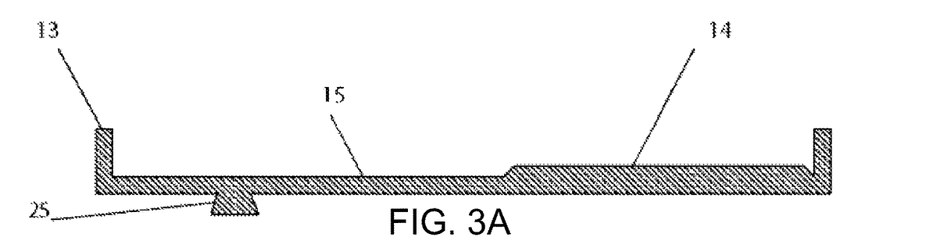
FIG. 3A shows a cross section of a first vat and FIG. 3B shows a cross section of a second vat.
Figure 3B:
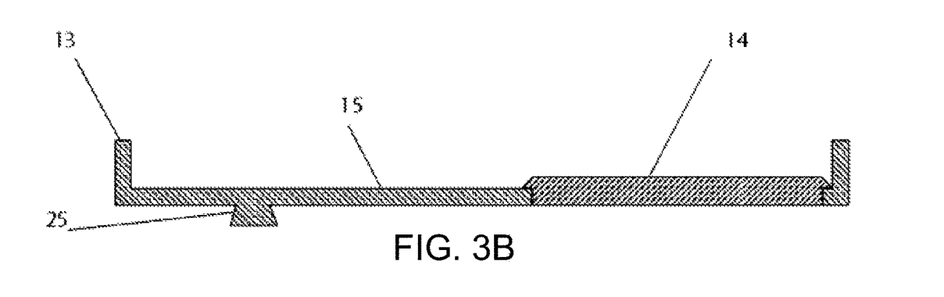
Figure 4:
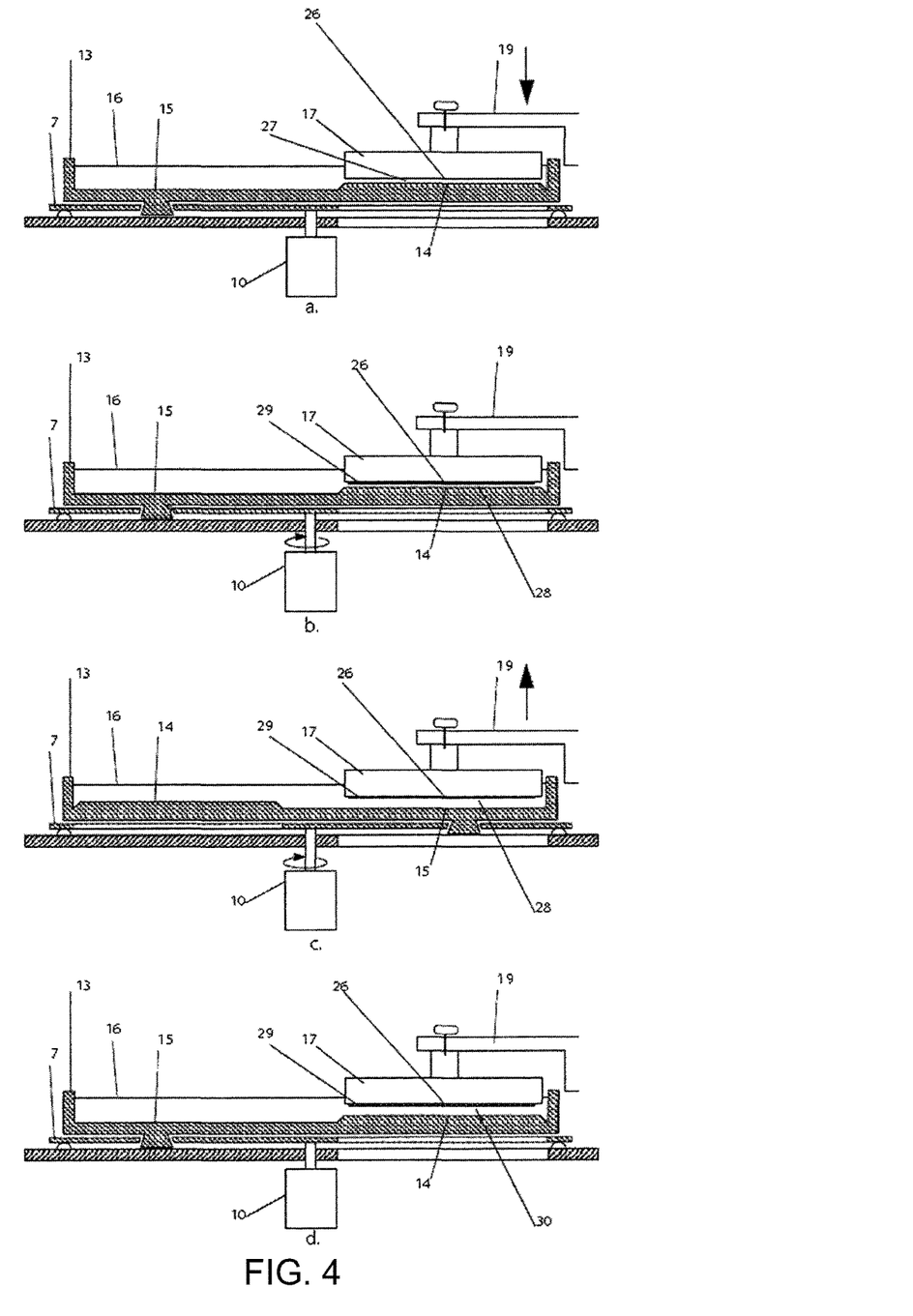
FIGS. 4A, 4B, 4C, and 4D illustrates the apparatus of FIG. 1 at various stages of use.

With reference to FIGS. 2, 3 and 4, the apparatus for bottom-up fabrication of three dimensional objects includes a vat 13 for a photosensitive polymer 16, a build platform 17 an elevator mechanism 19 and a rotation mechanism 7.

The floor of the vat includes a working surface 14 at which light from a light source 21 incident on the working surface interacts with photosensitive polymer 16 at the working surface to fabricate a portion of the three dimensional object.

The build platform has a planar surface 26, and the elevator mechanism 19 is arranged to hold the build platform above the vat such that when the working surface of the vat is located directly underneath the build platform, the planar surface of the build platform is parallel with the working surface 14.

The build platform 17 is the part onto which the cured cross-sections are built. The build platform 17 is attached to the elevator mechanism 19 by a quick release mechanism 18. The elevator mechanism 19 is powered by a stepping motor 20 which enables controlled movement of the build platform 17 in the z-axis (i.e. in the vertical direction). The elevator mechanism is therefore capable of adjusting the separation between the working surface 14 of the vat 13 and the planar surface 26 of the build platform 17, the separation being the distance in the vertical direction (i.e. the direction normal to the planar surface and normal to the working surface of the vat).

The rotation mechanism takes the form of a rotatable plate 7 onto which the vat 13 is mounted. The rotatable plate is circular and is connected to a stepping motor 10. The stepping motor controls the rotation of the circular plate and therefore the rotation of the vat in a controlled manner about an axis which is normal to the working surface at the floor of the vat.

The vat 13 includes an integral plug 25, and the rotatable plate 7 includes an aperture 24 (i.e. a cut-out) the plug 25 being configured to engage the aperture 24 to secure the vat 13 to the rotatable plate 7. As the plugs 25 are made from liquid silicone rubber they can deform into the apertures 24, thus fastening the vat 13 in place without the use of complex mechanisms. Furthermore, the apertures 24 and plugs 25 allow for quick and easy removal of the vat 13.

In the embodiment shown in FIG. 2, the axis of rotation about which the relative rotation occurs is the central axis of the rotatable plate 7.

The vat consists of a floor and surrounding walls, the floor including a first floor portion 14 having a first thickness and a second floor portion 15 having a second floor thickness, the second thickness being less than the first thickness. In this way, when the vat is filled with liquid photosensitive polymer the first floor portion is a raised working surface, and the second floor portion forms a deeper channel of photosensitive polymer.

The apparatus includes a source of electromagnetic radiation in the form of a digital projector 21. The digital projector 21 consists of a 405 nm LED, a spatial light modulator and a projection lens. The 405 nm LED can be turned on and off independently of turning the spatial light modulator on and off. The preferred spatial light modulator is a DMD however any spatial light modulator such as LCD, LCOS etc. could be used. The digital projector 21 is located such that the projected image fits within the bounds of the apertures 6 and 8 so that the projected image is in focus at the raised working surface 14. The size of the working surface 14 and the build platform 17 are slightly larger than the size of the projected image at the raised working surface 14. The apparatus is controlled by a networked computer 22, which receives the 3D object data over a network and synchronises the output of the stepping motors 10 and 20 and the projector 21 it also providing updates on the progress of the fabrication to other networked computers. Enclosing the top half of the apparatus 1 is a cover 23, which is fabricated from a transparent material that blocks electromagnetic radiation with wavelengths below 450 nm.

The apparatus 1 includes a frame 2, which has a bottom 3, a top 4, sides 5 and an aperture 6. The rotatable plate 7 is located directly above the top of the frame 5. The rotatable plate 7 includes an aperture 8 made from an optically clear material which allows light from the projector 21 to get to the vat 13. The rotatable plate 7 sits on casters 9 so that the rotatable plate is free to rotate.

Referring to FIG. 3, the vat 13 is either entirely fabricated from optically clear liquid silicone rubber (FIG. 3A) or the first floor portion 14 is fabricated from optically clear silicone pad and set into the second floor portion 15 that is fabricated from a stiffer non-optically clear liquid silicone rubber (FIG. 3B). The optically clear silicone pad which forms the first floor portion may be replaceable or may be permanently fixed to the second floor portion. Both types of vat are suitable for use with all of the apparatuses described herein.

It is crucial that the vat 13 is fabricated from a material that inhibits the cure of the liquid photosensitive polymer. The preferred material is generically referred to as liquid silicone rubber (LSR). More specifically, it is an addition cured vinyl terminated-polydimethylsiloxane, where the catalyst is platinum.

Phenyl resins are preferably added to the vat material to ensure that the optically clear silicones do not yellow under UV light. This is particularly advantageous where light of 405 nm is used. The optical grade of the LSR used is preferably QSIL 216 although QSIL 218 may also be used.

Where a stiffer non-optically clear liquid silicone rubber is used, due to its high tear strength and elastic modulus, MM 730FG is a suitable grade. In this way, the non-optically clear parts of the vat will be relatively stiff and will not deform easily. This is especially true for a wall thickness of at least 5 mm. MM260 grade may also be used.

In operation, the cross-sectional data of the 3D model and a configuration file is transferred to the controlling computer 22 by the user over a network. The vat 13 is then filled with liquid photosensitive polymer 16 up to a prescribed level. Once the operator has confirmed that the vat 13 has sufficient photosensitive polymer 16 to fabricate the desired 3D object and that the build platform 17 is clean and securely fastened to the elevator mechanism 19 the fabrication process begins. Checking of the photosensitive polymer 16 level may be done manually by eye or using a liquid depth sensor (not shown).

At the beginning of each fabrication the following calibration process is carried out. The calibration process ensures that all subsequent cross-sections are of the desire thickness.

As shown in FIG. 4A, the rotatable plate 7 is rotated to its start position by a first stepper motor 10. The start position is defined as the working surface 14 of the vat being located under build platform 17 and the apertures 6 and 8 being coincident. The start position may be defined by a microswitch (not shown) located on the elevator mechanism. Thus, when the elevator mechanism reaches the start position, the micro switch is triggered. The elevator mechanism 19 and a second stepper motor 20 (not shown in FIG. 4) then move the build platform 17 to its start position at which the face of the build platform 26 is located beneath the surface of the photosensitive polymer 16 so that a layer of photosensitive polymer 27 less than 1 mm is sandwiched between the planar surface 26 of the build platform 17 and the working surface 14. Again a micro switch may define this start position (not shown).

The digital projector 21 then projects an image that is the maximum size of the photo mask onto the layer of photosensitive polymer 27 thereby curing it onto the planar surface 26 of the build platform 17. The duration of exposure of this first layer can be in the order of a minute.

As shown in FIG. 4B, after exposure, due to the oxygen richness of the liquid silicone rubber vat 13, which inhibits the cure of acrylate polymers, a lubricating layer 28 of uncured photosensitive polymer exists between the working surface 14 and the cured photosensitive polymer 29. This means that the cured photosensitive polymer has not formed a bond with the raised working surface 14.

As shown in FIG. 4C, the circular plate 7 is then rotated 180 degrees positioning the second floor portion (the deeper channel) 15 below the build platform 17. This increases the depth of uncured photosensitive polymer 16 between the cured photosensitive polymer 29 and the vat 13 thus the separation forces decreases and the elevator mechanism 19 can easily move the build platform 17 up by a distance defined by the cross-sectional thickness of the layers of the 3D model.

As shown in FIG. 4D, the rotatable plate 7 is then rotated a further 180 degrees, resulting in re-positioning of the working surface 14 beneath the build platform 17 and also recoating the working surface 14 with a fresh layer of photosensitive polymer 16. This means that there is a layer of photosensitive polymer 30 between the raised working surface 14 and the face of the build platform 26 that corresponds to the desired thickness of the specific layer or cross section of the 3D model.

After calibration, the following printing process is carried out:

1. The digital projector 21 exposes the layer of photosensitive polymer 30 to the first '2D' cross section as shown in FIG. 2. The exposure time depends on the desired thickness of the cross section.

2. After exposure, and as described above, there exists a lubricating layer on uncured photosensitive polymer 28. The circular plate 7 rotates 180 degrees as shown in FIG. 4C positioning the deeper channel under the build platform 17.

3. The build platform 17 is raised by the elevator mechanism 19 by desired cross-sectional thickness of the next layer.

4. The circular plate 7 rotates back 180 degrees repositioning the working surface 14 under the build platform and re-coating the build platform with fresh photosensitive polymer that is the thickness of the next cross-section 30 as shown in FIG. 4D.

5. During steps 2-4 the 405 nm LED is turned off by the controlling computer 22 and the controlling computer 22 prepares the next cross section to be displayed and sends this to the digital projector 21.

The above process is repeated until the final cross section is completed to create the final material layer of the three dimensional object.

Once fabrication of the three dimensional object is completed, the elevator mechanism 19 moves to an end position located at the top of the apparatus 1. This allows the easy removal of the build platform 17 using the quick release mechanism 18. The three dimensional object needs to be removed from the build platform 17 and cleaned. Whilst this occurs a second build platform 17 can be attached to the elevator mechanism 19 and the photosensitive polymer 16 level in the vat 13 can be checked to ensure the apparatus 1 is ready to fabricate the next three dimensional object.

Figure 5:
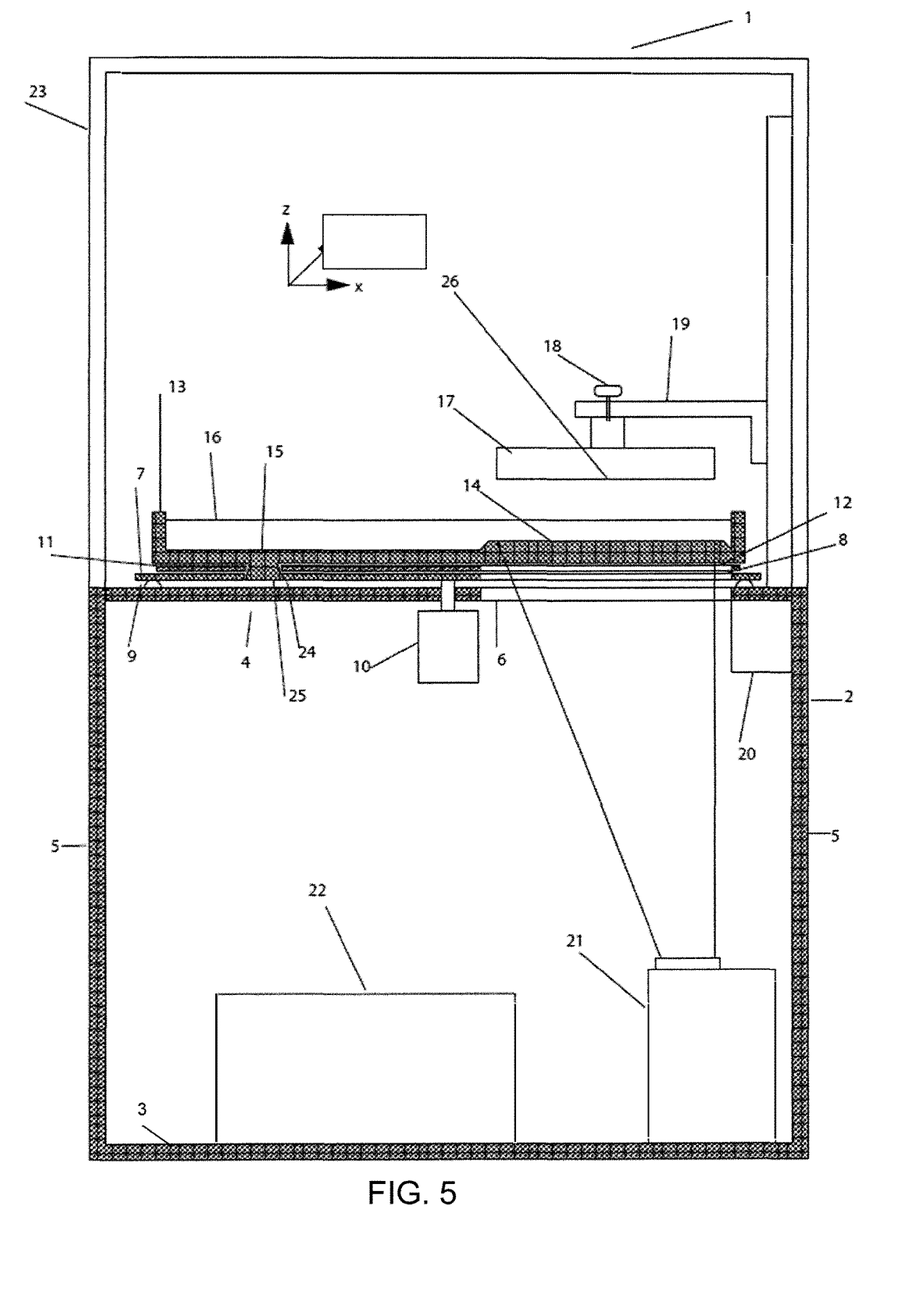
FIG. 5 shows a cross section of an apparatus according to a second embodiment of the present invention.

FIG. 5 shows a second embodiment which differs from the first embodiment in that it further comprises a heating element 11, which has an aperture 12 that sits in between the rotation mechanism 7 and the vat 13 such that the apertures 8 and 12 are coincident and beneath the raised working surface 14.

In operation, the heating element 11 is turned on before calibration in order to heat up the resin 16 to a temperature of 40-90° C., the temperature depending on the formulation of the photosensitive polymer. A controlling computer 22 regulates the temperature of the heating element 11. At the end of fabrication the heating element is turned off and the photosensitive polymer 16 returns to room temperature.

The temperature of the photosensitive polymer needs to be precisely controlled in order to avoid the production of any vapours, which could be potentially unpleasant; this is achieved by the controlling computer.

Figure 6:
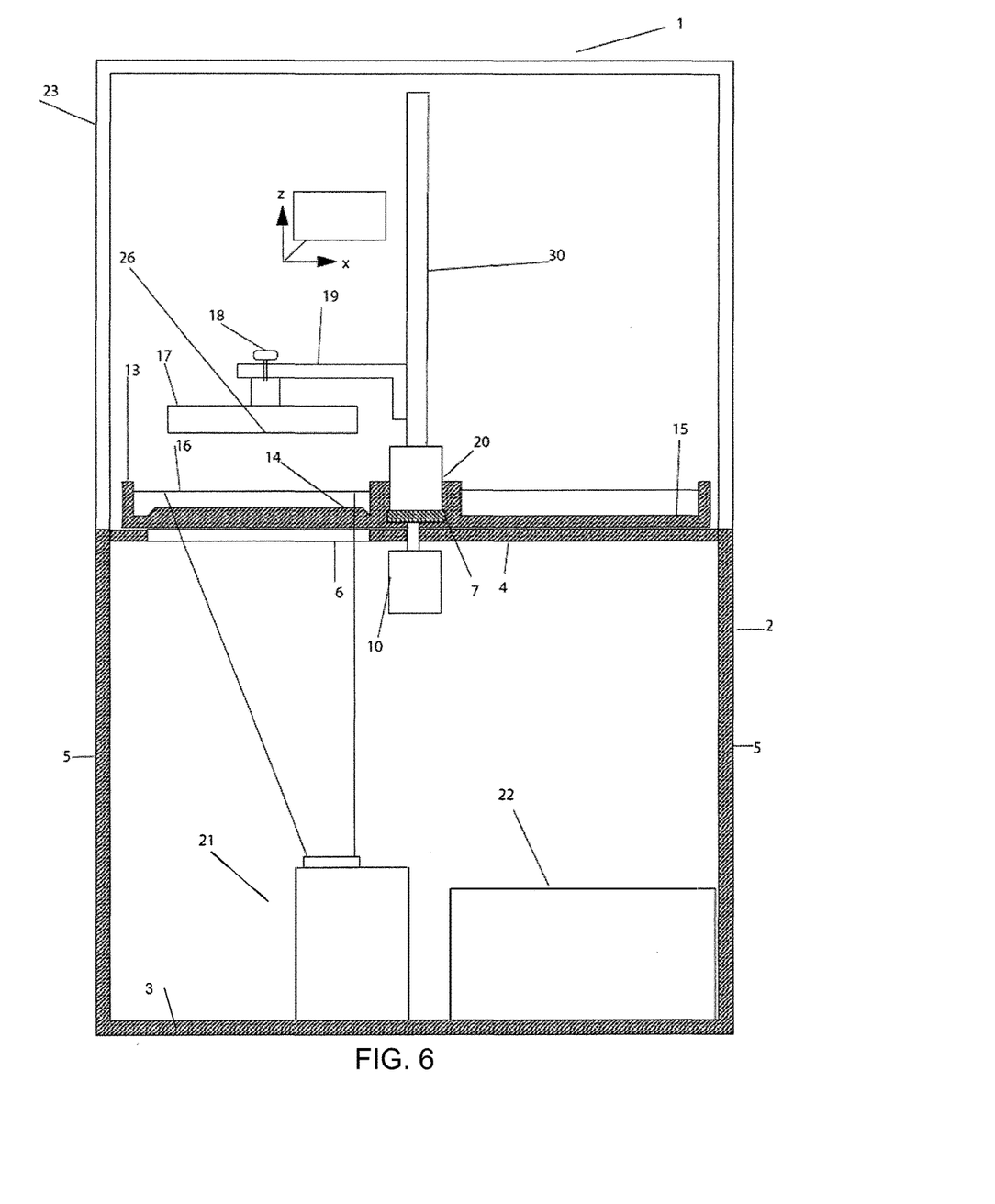
FIG. 6 shows a cross section of a third embodiment of the present invention.

FIG. 6 depicts a third embodiment, where like reference numerals are used to label the same features as the previous embodiments. The third embodiment differs from the first embodiment in that relative rotation of the vat and the build platform is achieved by a rotation mechanism arranged to rotate the build platform 17.

The rotation mechanism takes the form of a first stepper motor 10 attached to the elevator mechanism 19. The build platform 17 is attached to the first stepper motor 10 by quick release mechanism 18. In this embodiment, the axis of relative rotation is the central axis of the first stepper motor 10. The controlling computer 22 controls the rotation of the build platform about this central axis.

In this embodiment, there is no need for a rotation mechanism. The frame 3 includes an aperture 124 and the plug 25 is configured to engage the aperture 124.

Figure 7:
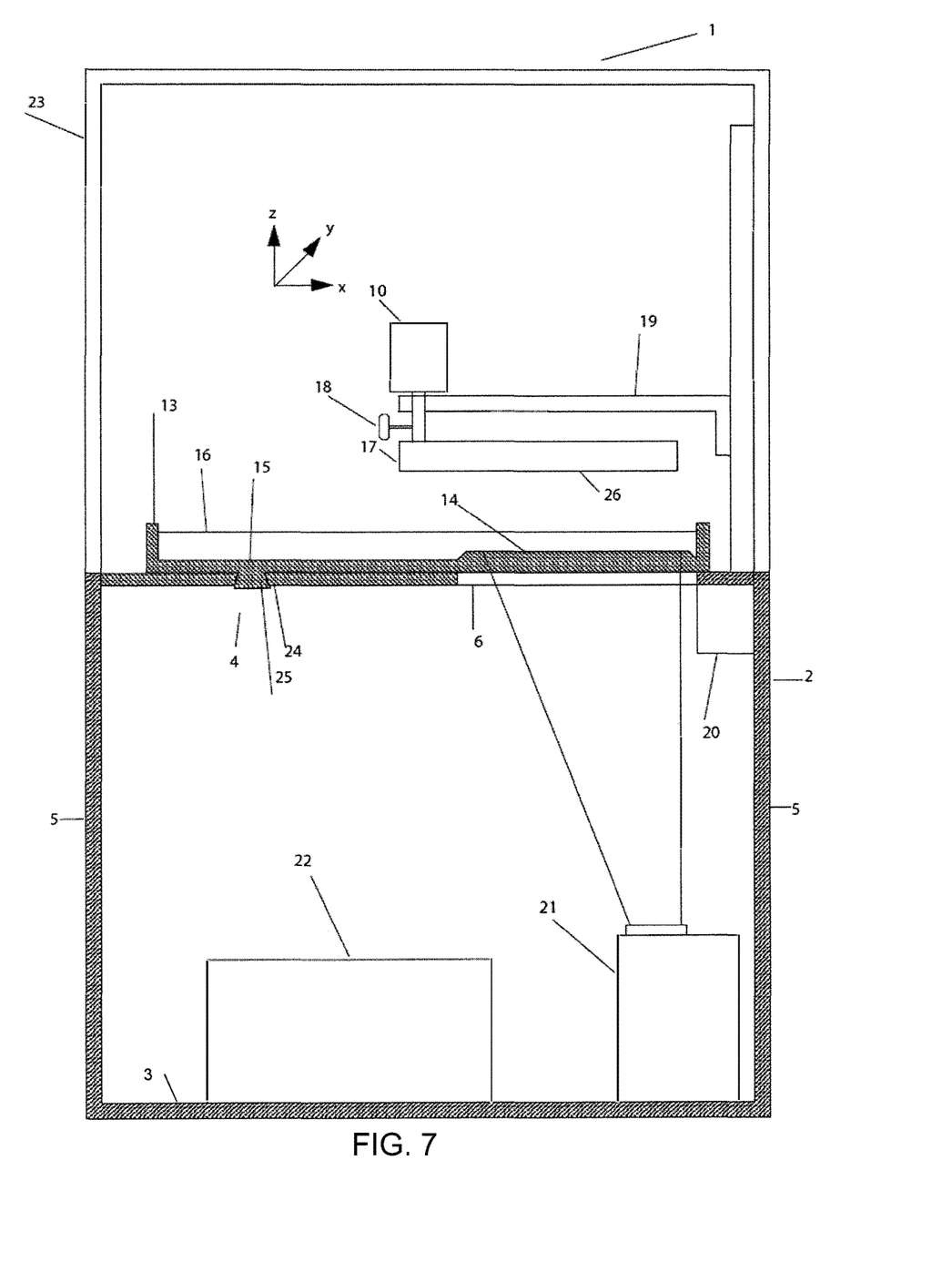
FIG. 7 shows a cross section of a fourth embodiment of the present invention.
Figure 8A:
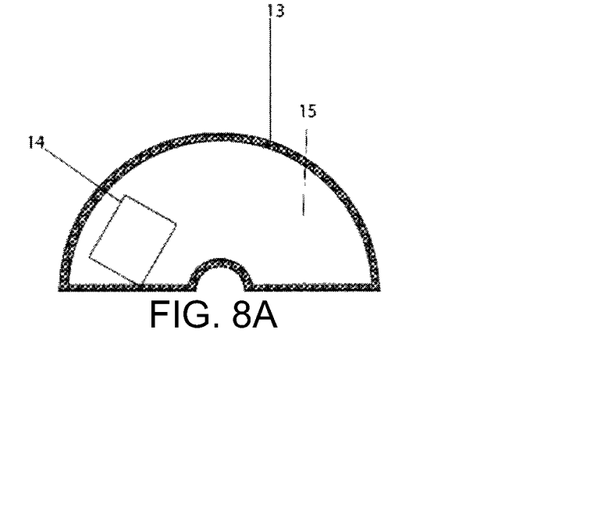
FIGS. 8A, 8B and 8C show schematic views taken from above of the apparatus of FIG. 7.
Figure 8B:
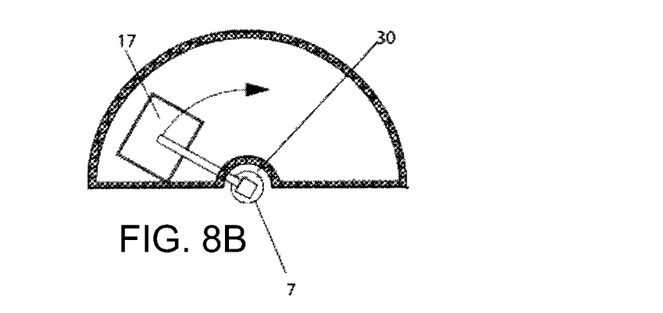
Figure 8C:
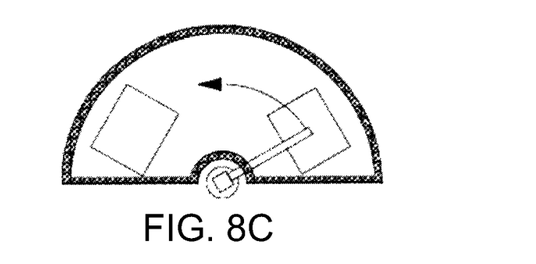

A fourth embodiment is shown in FIGS. 7 and 8. This embodiment shares most of the features of the first embodiment but differs from the first embodiment in that a z-axis assembly (including the elevator mechanism 19, the build platform 17, the quick release motor and the second stepper motor 20) is located on top of the rotation mechanism 7 such that the rotation of the first stepper motor 10 has the effect of rotating the z-axis assembly 30. The vat 13 is in a fixed position on the top of the frame 4.

The operation of the system is similar to that described above, with the exception that it is the z-axis assembly 30 that rotates during the relative rotation and the vat 13 remains in a fixed position. This embodiment is advantageous in that the size of the apparatus 1 is reduced. The torque required by the first stepper motor 10 is also reduced, as is the duration of time taken between the curing of each material layer.

The operation of this embodiment is shown in FIGS. 8A, 8B, and 8C. The vat 13 is shown in FIG. 8A. with the working surface 14 of the first floor portion fabricated from optically clear liquid silicone rubber and the deeper channel 15 of the second floor portion. As shown in FIG. 8B, after a layer has been cured onto the build platform 17 the z-axis assembly 30 rotates 120 degrees about its central axis. This moves the build platform 17 from the raised working surface 14 into the deeper channel 15. The elevator mechanism 19 then moves the build platform 17 up by the desired thickness. As shown in FIG. 8C, the z-axis assembly then rotates back 120 degrees thereby moving the build platform back over the raised working surface at the new height thereby re-coating the build platform with fresh photosensitive polymer ready for fabrication of the next material layers.

120° is the minimum angle of rotation required for the build platform to have moved completely away from the working surface. The angle could range between 120°-360°, but is preferably selected 120° as this leads to the shortest distance and therefore advantageously reduces the duration of time taken between layers for the overall print process.

Figure 9A:
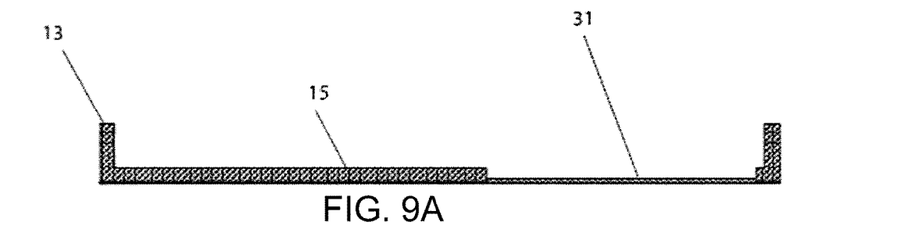
FIGS. 9A, 9B and 9C show cross sections of a third vat.
Figure 9B:
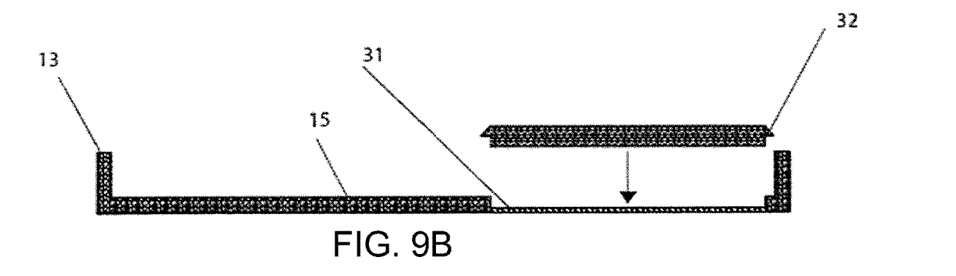
Figure 9C:
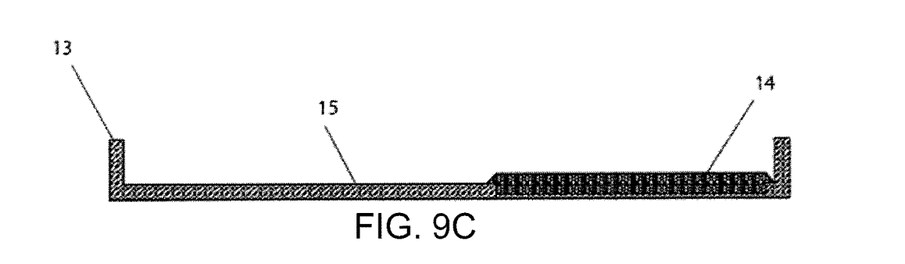

Referring to FIGS. 9A, 9B and 9C, a third type of vat is shown which is suitable for use with any of the apparatuses described herein. The vat of FIGS. 9A, 9B and 9C is similar to that of FIG. 3B in that it includes a replaceable optically clear silicone pad. However, it differs from the first and second vats shown in FIGS. 3A and 3B in that the vat of FIG. 9A is not made entirely from silicone.

As shown in FIGS. 9A, 9B and 9C, the vat comprises a vat body 13 and an optically clear silicone pad 32. The vat body 13 including a recessed section 31, and the optically clear silicone pad configured to be located in the recessed section.

The optically clear silicone pad 32 forms a first portion 14 of the floor of the vat which corresponds to a raised working surface of the floor of the vat. The remainder of the vat body 13 forms the second portion of the floor of the vat 15 as well as the surrounding walls of the vat. When the optically clear silicone pad is located in the recessed section 31 of the vat body, the raised working surface formed by the optically clear silicone pad is located at least 1 mm above the deeper channel of the second floor portion.

The recessed section 31 is fabricated from an optically clear material (preferably a thermoplastic) that is positioned such that when the vat 13 is fixed to the apparatus of any of the embodiments described above, the apertures in the frame, rotatable plate and heating element 6,8 and 12 lie are aligned with the recessed section 31.

The vat body 13 of the vat may be fabricated from any suitable material such as a thermoplastic. A water tight seal can be created between the first floor portion of the optically clear silicone pad and the second floor portion of the vat body 13.

In a further embodiment (not shown), the apparatus may take the form of any of the previously described embodiments, but the projector 21 is replaced with any directional source of electromagnetic radiation. This may be, for example a scanning laser or an array of LEDs.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. An apparatus for bottom-up fabrication of three dimensional objects, the apparatus comprising: a vat for a photosensitive polymer, a floor of the vat including a working surface arranged such that, in use, light incident on the working surface interacts with the photosensitive polymer at the working surface to fabricate a portion of the three dimensional object; a build platform configured to be inserted into the vat, the build platform having a planar surface; an elevator mechanism configured to adjust a separation between the working surface of the vat and the planar surface of the build platform; and a rotation mechanism configured to vary a relative rotational position of the vat relative to the build platform, the relative rotational position being about an axis which is normal to the working surface of the vat; wherein the floor includes a first floor portion of a first thickness and a second floor portion of a second thickness, the second thickness being less than the first thickness; wherein the first floor portion has a first vertical side, the second floor portion has a second vertical side, and the first vertical side directly contacts the second vertical side, and wherein the rotation mechanism is configured to vary the relative rotational position about the axis between a first position and a second position, the first position locating the first floor portion under the planar surface of the build platform to fabricate the portion of the three dimensional object at the working surface, and the second position locating the second floor portion under the planar surface to increase a depth of the photosensitive polymer between the portion of the three dimensional object and the floor of the vat.

2. The apparatus of claim 1, wherein the rotation mechanism is arranged to vary the rotational position of the vat.

3. The apparatus of claim 2, wherein the rotation mechanism is a rotatable plate upon which the vat is mounted.

4. The apparatus of claim 3, wherein the vat includes a plug and the rotatable plate includes an aperture, the plug being configured to engage the aperture to secure the vat to the rotatable plate.

5. The apparatus of claim 1, wherein the rotation mechanism is arranged to vary the rotational position of the build platform.

6. The apparatus of claim 1 further comprising a heating element in thermal contact with the vat.

7. The apparatus of claim 1 wherein the floor of the vat has a thickness of at least 5 mm.

8. The apparatus of claim 1, wherein the first floor portion has a thickness of at least 6 mm and the second floor portion has a thickness of at least 5 mm.

9. The apparatus of claim 1 wherein the vat is formed entirely of a liquid silicone rubber.

10. The apparatus of claim 1, wherein the vat is made of optically clear material comprising a thermoplastic and is not made entirely of a liquid silicone rubber, and the first floor portion comprises a replaceable optically clear silicone pad comprising the first vertical side and the working surface.

11. An apparatus for bottom-up fabrication of three dimensional objects, the apparatus comprising: a vat for a photosensitive polymer, a floor of the vat including a working surface arranged such that, in use, light incident on the working surface interacts with the photosensitive polymer at the working surface to fabricate a portion of the three dimensional object; a build platform configured to be inserted into the vat, the build platform having a planar surface; an elevator mechanism configured to adjust a separation between the working surface of the vat and the planar surface of the build platform; and a rotation mechanism configured to vary a relative rotational position of the vat relative to the build platform, the relative rotational position being about an axis which is normal to the working surface of the vat; wherein the floor includes a first floor portion of a first thickness and a second floor portion of a second thickness, the second thickness being less than the first thickness; and wherein the rotation mechanism is configured to vary the relative rotational position about the axis between a first position and a second position, the first position locating the first floor portion under the planar surface of the build platform to fabricate the portion of the three dimensional object at the working surface, and the second position locating the second floor portion under the planar surface to increase a depth of the photosensitive polymer between the portion of the three dimensional object and the floor of the vat.

12. The apparatus of claim 11, wherein the rotation mechanism is arranged to vary the relative rotational position of the vat.

13. The apparatus of claim 12, wherein the rotation mechanism is a rotatable plate upon which the vat is mounted.

14. The apparatus of claim 13, wherein the vat includes a plug and the rotatable plate includes an aperture, the plug being configured to engage the aperture to secure the vat to the rotatable plate.

15. The apparatus of claim 11, wherein the rotation mechanism is arranged to vary the rotational position of the build platform.

16. The apparatus of claim 11, further comprising a heating element in thermal contact with the vat.

17. The apparatus of claim 11, wherein the floor of the vat has a thickness of at least 5 mm.

18. The apparatus of claim 11, wherein the first floor portion has a thickness of at least 6 mm and the second floor portion has a thickness of at least 5 mm.

19. The apparatus of claim 11, wherein the vat is formed entirely of a liquid silicone rubber.

20. The apparatus of claim 11, wherein the vat is made of optically clear material comprising a thermoplastic and is not made entirely of a liquid silicone rubber, and the first floor portion comprises a replaceable optically clear silicone pad comprising the working surface.

* * * * *